United States Patent [19]

Iwashita et al.

[11] 4,342,737

[45] Aug. 3, 1982

[54] PROCESS OF PRODUCING A POTASSIUM SULFATE SALT

[75] Inventors: Hidemaro Iwashita; Kenichi Hayashi, both of Nobeoka, Japan

[73] Assignee: Asahi Kasei Kogyo Kabushiki Kaisha, Japan

[21] Appl. No.: 104,049

[22] Filed: Dec. 17, 1979

[30] Foreign Application Priority Data

Dec. 25, 1978 [JP] Japan .............................. 53-158444
Jun. 8, 1979 [JP] Japan .............................. 54-71145

[51] Int. Cl.$^3$ .................. C01B 7/01; C01B 17/96; C01D 5/02; C05D 1/02
[52] U.S. Cl. ................................ 423/522; 423/520; 423/482; 71/61; 71/63
[58] Field of Search .............. 423/482, 552, 520; 71/61, 63

[56] References Cited

U.S. PATENT DOCUMENTS

| | | | |
|---|---|---|---|
| 1,099,451 | 6/1914 | Meyer et al. | 423/482 |
| 1,389,861 | 9/1921 | Comment | 423/552 |
| 1,389,862 | 9/1921 | Comment | 423/552 |
| 1,966,820 | 7/1934 | Jones | 71/61 |
| 2,081,118 | 5/1937 | Kast | 423/482 |
| 2,082,809 | 6/1937 | Penwell | 71/61 |
| 2,208,175 | 7/1940 | Wilson | 423/482 |
| 2,762,689 | 9/1956 | Giraitis et al. | 423/482 |
| 3,363,977 | 1/1968 | Rediness | 423/482 |
| 3,888,653 | 6/1975 | Shirley | 71/61 |

FOREIGN PATENT DOCUMENTS

| | | | |
|---|---|---|---|
| 238570 | 10/1921 | Fed. Rep. of Germany | 423/482 |
| 261411 | 10/1921 | Fed. Rep. of Germany | 423/482 |
| 51-39273 | 4/1976 | Japan | |
| 134214 | 3/1920 | United Kingdom | 423/552 |
| 970744 | 9/1964 | United Kingdom | 423/552 |

OTHER PUBLICATIONS

Perry, John H. Editor, Chemical Engineers Handbook Third Edition, McGraw-Hill Book Co. NY NY, 1950 pp. 1202-1221.

*Primary Examiner*—Gary P. Straub
*Attorney, Agent, or Firm*—Finnegan, Henderson, Farabow, Garrett & Dunner

[57] ABSTRACT

A process of producing a potassium sulfate salt comprising reacting sulfuric acid with potassium chloride at an equivalent ratio of sulfuric acid to potassium chloride of 1.07 to 1.40 at a temperature of from the melting point of potassium bisulfate to about 500° C. while allowing the resulting solid-liquid mixture at the final reaction stage to be substantially in a state of wet cake, said potassium bisulfate being present in the reaction system until the termination of the reaction because of the excess sulfuric acid. In such a process, the reaction proceeds smoothly at a relatively low temperature and is completed in an extremely shortened period of time to produce a potassium sulfate salt with an extremely low chlorine content which is useful as a raw material for the production of potassium-containing chemical manures to be suitably applied onto the farmland of tobacco etc. which are apt to have their growth hampered by chlorine values. In the present process, when the reaction mixture is kneaded, the rate of reaction is extremely accelerated, and as a result, the reaction period of time needed for lowering the chlorine content of the product to a limited level is markedly shortened.

7 Claims, No Drawings

PROCESS OF PRODUCING A POTASSIUM SULFATE SALT

This invention relates to a process of producing a potassium sulfate salt. More particularly, the present invention is concerned with a process of producing a potassium sulfate salt of which the chlorine content is extremely low and which is therefore very useful as a fertilizer by reacting potassium chloride with sulfuric acid under relatively mild reaction conditions.

As a potassium salt for low chlorine content fertilizers, there is, in general, employed potassium sulfate. Potassium sulfate produced according to the customary methods usually contains chlorine values in an amount of about 2.0 to about 5.0% by weight. The use of the potassium sulfate having such a relatively high content of chlorine values as a fertilizer often has unfavorable influences on not only the farm products but also the farmland. Especially with respect to special kinds of plants such as tobacco, it is said that they are highly sensitive to and apt to have their growth hampered by the chlorine values contained in the chemical manure applied to the field thereof. Recently, there is a general tendency that the standard in respect of the chlorine content of a potassium sulfate product for use as a fertilizer becomes severe more and more. With respect to special kinds of plants such as tobacco, the chlorine content of a chemical manure is restricted to a further low level, that is, the chlorine content is required to be not more than about 1.0% by weight, preferably not more than 0.3% by weight.

As a general process of producing potassium sulfate, there is known such a process that, as is shown by the reaction formulae (1) and (2), potassium chloride is reacted with sulfuric acid to obtain potassium sulfate through potassium bisulfate and hydrogen chloride as a by-product.

$$KCl + H_2SO_4 = KHSO_4 + HCl \quad (1)$$

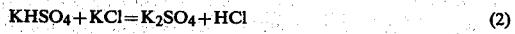

$$KHSO_4 + KCl = K_2SO_4 + HCl \quad (2)$$

In continuously practicing the above-mentioned process on an industrial scale, potassium chloride is reacted with a substantially stoichiometric amount of sulfuric acid at temperatures not exceeding about 120° C. to effect substantial completion of the reaction of the above formula (1) and the resultant reaction mixture is subsequently subjected to a heat treatment at temperatures as high as about 500° to about 600° C. for about 3 to about 6 hours in a vertical type Mannheim muffle furnace or a horizontal type muffle furnace (see, for example, Japanese Patent Application Publication No. 2264/1960) thereby to effect the reaction of the above formula (2). The potassium sulfate thus obtained is a so-called ordinary product of which the chlorine content is as high as about 2 to about 5% by weight. In order to obtain potassium sulfate with a lower chlorine content, it is necessary that the above-mentioned product be pulverized and sieved, followed by addition of a small amount of sulfuric acid, and the resultant mixture be subjected to a further calcination treatment at a temperature as high as about 800° C. for about 2 to about 3 hours in a rotary kiln. Thus, according to the above-mentioned conventional process, it is extremely difficult to obtain, in one step, a low chlorine content potassium sulfate having a chlorine content as low as not more than 1% by weight, and further, it is utterly impossible to commercially obtain an extremely low chlorine content potassium sulfate having a chlorine content as low as not more than 0.3%. The reason for this is not exactly known but believed to be as follows. When potassium chloride is reacted with a substantially stoichiometric amount of sulfuric acid, the amount of the potassium chloride (solid) employed as the raw material as well as the amount of potassium bisulfate (in a molten state) which is a reaction product of the reaction of the above formula (1) becomes small in the reaction system at the final stage of the reaction of the above formula (2), with increase in amount of potassium sulfate (solid) which is the end product. Accordingly, the apparent rate of reaction is extremely lowered and the reaction is substantially interrupted. This is so because the minute quantities of the potassium chloride and the potassium bisulfate remain separately in lumps of the solid potassium sulfate so that the potassium chloride cannot physically contact with the potassium bisulfate. Therefore, the chlorine content of the potassium sulfate product cannot be lowered to below a certain level.

As processes for producing a potassium sulfate product of which the chlorine content is minimized, there are known a process in which finely pulverized potassium chloride is reacted with sulfuric acid whose amount is in excess of the theoretical amount (see U.S. Pat. No. 1,389,862) and a process which comprises finely grinding potassium chloride and potassium bisulfate, admixing them and subjecting the resulting mixture to a reaction therebetween, said potassium bisulfate being employed in excess of the theoretical amount (see U.S. Pat. No. 1,389,861). In the former patent, with respect to the rate of excess of sulfuric acid, there is a definition only to the effect that the rate of excess of sulfuric acid be several percent or such as to keep a moist mixture of sulfuric acid and potassium chloride prior to the reaction in a powdery state. Further, in the former patent, it is mentioned that in the product obtained by calcining the above-mentioned moist mixture at about 300° C. for about 3 hours there still remains several percent of chlorine values. In order to completely remove the remaining chlorine values, it is necessary to subject the product to a further calcination treatment at temperature as high as about 700° to about 800° C. On the other hand, in the latter patent, it is mentioned that finely ground potassium chloride is reacted with finely ground potassium bisulfate whose amount is 3 to 5% in excess of the theoretical amount by calcination at a relatively low temperature, i.e., at about 300° to 350° C. whereby there can be obtained potassium sulfate in which chlorine values scarcely remain. According to the actual experiments of the present inventors, however, it has been revealed that by the use of such a rate of excess of potassium bisulfate as employed in the latter process there cannot be obtained a potassium sulfate product with a chlorine content of not more than 1.0%. In view of the fact that there is no description of agitation of the reaction mixture in U.S. Pat. Nos. 1,389,861 and 1,389,862, it has been regarded as the sole measure for promoting the reaction to use raw materials in the form of fine particles. Accordingly, it is natural that, in the process of U.S. Pat. No. 1,389,862 which comprises finely grinding only potassium chloride and reacting the resulting finely particulate potassium chloride with sulfuric acid, the effect achieved by having rendered the potassium chloride finely particulate cannot continue to be exerted until the final reaction stage because the potassium chloride cannot retain its finely particulate form until the final reaction stage, so that the chlorine content of the product is as high as several percent, whereas, in the process of U.S. Pat. No. 1,389,861 which comprises solidifying potassium bisulfate formed as a by-product by cooling, finely grinding the solidified potassium bisulfate and sufficiently admixing the finely particulate potassium bisulfate with finely ground potassium chloride, followed by heating at a temperature above the melting point of the potassium bisulfate to effect the reaction, the amount of chlorine values remaining in the product is relatively small. Even in the latter process, however, the effect achieved by rendering raw materials finely particulate is limited and there cannot be obtained a potassium sulfate product with a chlorine content of less than 1.0 weight % because the rate of excess of potassium bisulfate is as small as 3 to 5%. In addition, in the latter process, there are needed such complicated procedures that the reaction is temporarily discontinued and potassium bisulfate formed as a by-product is solidified by cooling, followed by grinding of the solidified potassium bisulfate to obtain fine particles thereof. The complicated procedures lead to large loss of energy. This technique, therefore, cannot be practically adopted.

Accordingly, it is an object of the present invention to provide a process of producing, in one step, a potassium sulfate salt of which the chlorine content is extremely low by reacting potassium chloride and sulfuric acid under relatively mild reaction conditions.

It is another object of the present invention to provide a process of the above character, which can be stably practiced on a commercial scale.

The foregoing and other objects, features and advantages of the present invention will be apparent to those skilled in the art from the following detailed description and appended claims.

According to the present invention, there is provided a process of producing a potassium sulfate salt which comprises reacting sulfuric acid with potassium chloride at an equivalent ratio of sulfuric acid to potassium chloride of 1.07 to 1.40 at a temperature of from the melting point of potassium bisulfate to about 500° C. while allowing the resulting solid-liquid mixture at the final reaction stage to be maintained substantially in a state of wet cake, said potassium bisulfate being produced in the course of the reaction and being present in the reaction system until the termination of the reaction because of the excess sulfuric acid. The equivalent ratio of sulfuric acid to potassium chloride is represented by the formula $2[H_2SO_4]/[KCl]$ wherein $[H_2SO_4]$ and $[KCl]$ represent molar amounts of sulfuric acid and potassium chloride, respectively. The value of 1.07 to 1.40 in equivalent ratio of sulfuric acid to potassium chloride means that the amount of sulfuric acid is 1.07 to 1.40 times as much as the stoichiometric amount of sulfuric acid to be reacted with potassium chloride and is 0.07 to 0.40 equivalent in excess of the equivalent amount of the potassium chloride employed.

In practicing the process of the present invention, a potassium sulfate salt of which the chlorine content is extremely low can be obtained if the wet caky solid-liquid mixture at the final reaction stage is subjected to kneading but not simple agitation-mixing.

The term "potassium sulfate salt" used herein is intended to mean a salt comprising potassium sulfate as a main component, and further containing potassium bisulfate and other potassium salts of sulfuric acid such as potassium pyrosulfate in amounts such as will not be a substantial obstacle to the subsequent processes for the preparation of potassium-containing chemical manures or to the composition of the final chemical manures.

The amount of sulfuric acid to be employed in the process of the present invention is critical. Sulfuric acid is employed at an equivalent ratio of sulfuric acid to potassium chloride of 1.07 to 1.40, preferably 1.10 to 1.30, more preferably 1.10 to 1.20. Where the above-mentioned equivalent ratio is below 1.07, the reaction is substantially the same as that under the stoichiometrical conditions and, hence, at the final reaction stage, most of the resulting solid-liquid mixture becomes dry solid granules and cannot be maintained in a state of wet cake. On the other hand, where the above-mentioned equivalent ratio is more than 1.40, the chlorine content of the product becomes less than 1.0 weight % in a short period of time, but, instead, the potassium bisulfate content of the product becomes more than 55 weight % and, in addition, the resulting solid-liquid mixture at the final reaction stage is caused to assume a slurry-like state. The presence of such an excessive amount of potassium bisulfate in the potassium sulfate salt product causes various problems such as contamination of by-produced hydrogen chloride with the decomposition products of potassium bisulfate, and necessity of incorporation of a special neutralization step into the subsequent process for the preparation of chemical manures.

The following Experiment 1 was conducted to determine the relationship between the equivalent ratio of sulfuric acid to potassium chloride and the remaining chlorine content of the product in connection with the reaction period of time.

Experiment 1

Under substantially the same conditions as employed in Example 1 (which will be given later), the reactions were conducted at about 400° C., namely, at a temperature above the melting point of potassium bisulfate formed. This temperature is extremely mild for the reaction as compared with those employed in the conventional process in which a calcination treatment at high temperatures is necessarily involved. The results are shown in Table 1.

TABLE 1

| Equivalent ratio $\left(\dfrac{2[H_2SO_4]}{[KCl]}\right)$ | Reaction time (hr) | | | | | | |
|---|---|---|---|---|---|---|---|
| | 0.3 (%) | 0.6 (%) | 1.0 (%) | 2.0 (%) | 3.0 (%) | 4.0 (%) | 6.0 (%) |
| 1.00 | 7.5 | 6.0 | 4.0 | 3.5 | 3.3 | 3.0 | 2.7 |
| 1.05 | 4.0 | 3.5 | 2.5 | 1.5 | 1.5 | 1.5 | 1.3 |
| 1.07 | 3.0 | 2.0 | 1.3 | 0.9 | 0.6 | 0.5 | 0.3 |
| 1.10 | 2.5 | 1.7 | 1.0 | 0.7 | 0.5 | 0.2 | 0.1 |
| 1.12 | 1.0 | 0.6 | 0.3 | 0.2 | 0.1 | 0.1 | 0.1 |
| 1.15 | 0.9 | 0.5 | 0.3 | 0.1 | 0.1 | 0.1 | 0.1 |
| 1.20 | 0.7 | 0.4 | 0.3 | 0.1 | 0.1 | 0.1 | 0.1 |
| 1.30 | 0.5 | 0.3 | 0.3 | 0.1 | 0.1 | 0.1 | 0.1 |
| 1.40 | 0.5 | 0.3 | 0.1 | 0.1 | 0.1 | 0.1 | 0.1 |
| 1.50 | 0.6 | 0.3 | 0.2 | 0.1 | 0.1 | 0.1 | 0.1 |

(Note)
The figures with (%) show the remaining chlorine content (weight %) of the product.

As is apparent from Table 1, where the equivalent ratio of sulfuric acid to potassium chloride is 1.07 or more, the chlorine content of the final product comprising potassium sulfate can be less than 1.0 weight %, a value of the standard, by the one step treatment for not more than about 2 hours. On the other hand, where the above-mentioned equivalent ratio is less than 1.07, for example, 1.05, not only the resultant mixture cannot be maintained in a state of wet cake at the final reaction stage but also the chlorine content of the product cannot substantially be lowered below a certain level even by the reaction for a period of time as long as more than 4 hours. Therefore, in order to reduce the chlorine content of the product to not more than 1.0 weight % for utilizing the product as a fertilizer, it is necessary to subject the product to a further calcination treatment at such a high temperature of about 800° C. as employed in the conventional processes. As described before, the reason why the above-mentioned results were obtained is believed to be as follows. In case the amount of sulfuric acid and that of potassium chloride are substantially in stoichiometrical relationship, the reaction at the final stage is caused to be substantially of a solid phase. In contrast, in case the above-mentioned equivalent ratio is 1.07 or more, due to the formation and presence of the excess potassium bisulfate, the reaction proceeds while allowing the reaction mixture to be substantially in a state of wet cake, and even at the final reaction stage the reaction mixture is maintained substantially in a state of wet cake. In the process of the present invention, due to the above-mentioned specific state of the reaction system, the formation of hard secondary aggregation lumps each comprising potassium sulfate and unreacted potassium chloride occluded therein is suppressed, so that contact of the unreacted potassium chloride with an excessive amount of potassium bisulfate can be well maintained until termination of the reaction.

In general, for increasing the rate of reaction, it is desirable to increase the equivalent ratio of sulfuric acid to potassium chloride. However, so far as a decrease in the chlorine content of the product is concerned, the chlorine content of the product becomes substantially constant when the equivalent ratio of sulfuric acid to potassium chloride exceeds 1.40, and the use of an equivalent ratio of sulfuric acid to potassium chloride of more than 1.40 does not exert an appreciable effect on the decrease in the chlorine content of the product but causes the potassium bisulfate content of the product to be more than 55% and the solid-liquid mixture at the final stage of the reaction to be in a state of slurry. With respect to the product containing such a large excess amount of potassium bisulfate, the excess potassium bisulfate tends to easily decompose, thus causing the hydrogen chloride formed as a by-product to be contaminated with the resultant decomposition products, and a special treatment is needed for neutralization in the subsequent step for the production of chemical manures. From a viewpoint of the designing of a reaction apparatus also, since the reaction mixture is of a liquid phase even at the final stage of the reaction, there is encountered such a problem as corrosion of the reaction apparatus by the action of potassium bisulfate.

For the reasons as stated above, according to the present invention, there is employed an equivalent ratio of sulfuric acid to potassium chloride of 1.07 to 1.40. Further, in case the above-mentioned equivalent ratio is 1.10 or more, the reaction in a state of wet cake is extremely promoted and, as a result, the chlorine content becomes not more than 1.0 weight % in a short period of time not exceeding 1 hour. On the other hand, in case the above-mentioned equivalent ratio is more than 1.30, the effect of increase of the excess sulfuric acid is still observed but some disadvantages as mentioned above are gradually increased. Therefore, it is more preferred that the above-mentioned equivalent ratio be in the range of 1.10 to 1.30. The most preferred equivalent ratio of sulfuric acid to potassium chloride is in the range of 1.10 to 1.20.

In the present invention, the "state of wet cake" used to define the state of the solid-liquid mixture at the final reaction stage corresponds to the region ranging from the middle of the pendular region to the middle of the capillary region from a viewpoint of filled state and fluid state of the solid-liquid system. When consideration is given in connection with the kneading of the reaction mixture, it is preferred that the solid-liquid mixture be in a state of the funicular (I) or (II) region.

As described before, in the process of the present invention, it is requisite that the equivalent ratio of sulfuric acid to potassium chloride be in the range of 1.07 to 1.40, thereby rendering the solid-liquid mixture at the final reaction stage substantially in a state of wet cake. In the process of the present invention, it is also desirable to effect kneading of the solid-liquid mixture substantially in a state of wet cake. Kneading is different from a simple agitation-mixing but means an operation of forcibly milling and mixing the solid-liquid mixture. Therefore, the kneading includes the actions of crushing and milling-fragmenting the small lump granules in the dispersion system of the solid-liquid mixture. The extent of kneading depends on the ratio of solid to liquid in the solid-liquid mixture, particle size distribution of the solid, surface tension of the liquid, affinity between the solid and the liquid in the mixed system (wetting, interface tension and contact angle), apparatus factors attributable to the structure etc. of an agitator, and the like, and therefore cannot simply be quantitatively determined. In any way, kneading should be regarded as being distinct from a usual agitation-mixing from a viewpoint of chemical engineering. In order that phenomena peculiar to kneading occur in the process of the present invention, it is necessary that the solid-liquid mixture at the final stage of the reaction be in a state of wet cake and in such a densely filled state that the mixture is always subjected to plastic deformation by means of the agitating force generated by agitating blades. Also, it is desirable to employ an agitator of the structure suitable for kneading.

The following Experiment 2 is given to show the relationship between the equivalent ratio of sulfuric acid to potassium chloride and the state of the solid-liquid mixture at the final reaction stage etc., in connection with kneading.

Experiment 2

Under substantially the same conditions as employed in Example 3 (which will be given later), the reactions were conducted, with varied equivalent ratios of sulfuric acid to potassium chloride as indicated in Table 2. The reaction periods of time required for achieving decrease of the chlorine content of the product to predetermined levels were examined, and the results are shown in Table 2, together with the degree of contamination of the hydrogen chloride gas formed as a by-product. The state of the solid-liquid mixture at the final reaction stage, the filling level thereof and the kneading performance thereof are also shown in Table 2.

TABLE 2

Reaction Conditions and Results

| Run No. | Equivalent ratio (1) | State of solid-liquid mixture at final reaction stage (2) | Filling level (3) | Kneading performance (4) | Reaction time required (hr) (5) Cl ≦ 1.0 wt % | Reaction time required (hr) (5) Cl ≦ 0.3 wt % | Degree of contamination of hydrogen chloride by-produced (6) |
|---|---|---|---|---|---|---|---|
| 1 | 1.00 | Dry | O | X | >6 | >6 | 0.4 |
| 2 | 1.02 | Dry | O | X | 6 | >6 | 0.4 |
| 3 | 1.05 | Dry/Pendular* | O | Δ | 4 | >6 | 0.5 |
| 4 | 1.07 | Pendular | O | O | 0.7 | 2 | 0.5 |
| 5 | 1.10 | Funicular (I) | O | O | 0.5 | 1 | 0.8 |
| 6 | 1.12 | Funicular (I) | O | O | ≦0.3 | 0.7 | 0.8 |
| 7 | 1.15 | Funicular (I) | O | O | ≦0.3 | 0.7 | 0.9 |
| 8 | 1.20 | Funicular (I) | O | O | ≦0.3 | ≦0.5 | 1.1 |
| 9 | 1.30 | Funicular (II) | O | O | ≦0.3 | ≦0.5 | 1.3 |
| 10 | 1.40 | Capillary | O | Δ | ≦0.3 | ≦0.5 | 1.5 |
| 11 | 1.50 | Slurry | O | X | ≦0.3 | ≦0.5 | 5.0 |

Note
(1) Equivalent ratio of sulfuric acid to potassium chloride.
(2) The state of the solid-liquid mixture at the final reaction stage was visually determined according to the general classification for identifying the filled state and fluid state of the solid-liquid system.
(3) The filling level of raw materials in relation to the capacity of the reaction furnace was visually observed. The symbol "O" means that the reaction mixture was filled substantially to the height which the locus of rotation of the tip end of the blade of the agitator device reached.
(4) The kneading performance was visually determined by observing whether or not there occurred phenomena peculiar to kneading such as laminar flow shearing mixing, milling, folding, grinding, compression, etc. The symbols "O", "Δ" and "X" mean "good", "fairly good" and "poor" kneading performances, respectively.
(5) The reaction periods of time respectively required for decreasing the chlorine content of the product to not more than 1% and not more than 0.3% weight % were measured.
(6) The degree of contamination of the hydrogen chloride formed as a by-product is shown in terms of the total amount (gram) of sulfurous acid gas, sulfuric acid gas and sulfuric acid contained in 100 g of the hydrogen chloride gas generated at the time when the reaction was conducted at 400° C. for 2 hours.
*: A state intermediate between the dry state and the state corresponding to the pendular region.

As is apparent from Table 2, where the equivalent ratio of sulfuric acid to potassium chloride is less than 1.07, the amount of the remaining molten potassium bisulfate at the final reaction stage is extremely small and, therefore, the solid-liquid mixture is substantially in a dry and powdery state, so that phenomena peculiar to kneading hardly occur. Accordingly, although the degree of contamination of the hydrogen chloride formed as a by-product is low, a reaction period of time as long as 4 or more hours is needed for lowering the chlorine content of the product to not more than 1.0 weight %. Even after the reaction period of time of 6 hours, the chlorine content of the product is not lowered to not more than 0.3 weight %. On the other hand, where the equivalent ratio of sulfuric acid to potassium chloride is in the range of 1.07 to 1.40, the state of the solid-liquid mixture at the final reaction stage corresponds to a region ranging from the middle of the pendular region to the middle of the capillary region, namely, a region corresponding to the so-called state of wet cake as defined in the present invention. In such a region, there can be achieved an efficient kneading by choosing a suitable degree of filling of the raw materials and suitable agitation means. Under the reaction conditions as mentioned above, not only the degree of contamination of the hydrogen chloride formed as a by-product is not so high but also the remaining chlorine content of the product can be lowered to not more than 1.0 weight % within 1 hour and to not more than 0.3 weight % within 2 hours. In case the equivalent ratio of sulfuric acid to potassium chloride is more than 1.40, the state of the solid-liquid mixture at the final reaction stage does not correspond to the capillary region but to the slurry region and, as a result of this, phenomena peculiar to kneading can hardly occur. The presence of a large excess sulfuric acid causes the chlorine content of the product to be lowered to not more than 1.0 weight % or not more than 0.3 weight % within a short period of time even without substantial kneading. As stated before, however, when the equivalent ratio of sulfuric acid to potassium chloride exceeds 1.40, the amount of the remaining potassium bisulfate exceeds 50 weight %, and the degree of contamination of the by-produced hydrogen chloride with the decomposition products of the remaining potassium bisulfate becomes rapidly high even under relatively low temperature conditions. Moreover, in the subsequent step for the preparation of chemical manures a special treatment is needed for the neutralization of potassium bisulfate, leading to practical disadvantages. From a overall viewpoint of practice which is concerned not only with lowering of the chlorine content of the product to a desired level in a short period of time but also with elimination of the contamination of the hydrogen chloride formed as a byproduct and so on, according to the present invention, the equivalent ratio of sulfuric acid to potassium chloride is 1.07 to 1.40, preferably 1.10 to 1.30, more preferably 1.10 to 1.20. With the use of an equivalent ratio of sulfuric acid to potassium chloride of 1.10 to 1.30, the solid-liquid mixture at the final reaction stage is in a state of the funicular (I) or (II) region which is desirable. Furthermore, with the use of an equivalent ratio of sulfuric acid to potassium chloride of 1.10 to 1.20, the solid-liquid mixture at the final reaction stage is in a state of the funicular (I) region which provides the most desirable kneading performance stably in the practice of the process of the present invention on an industrial scale.

In order to further demonstrate the effect of the kneading, the following Experiment 3 is given.

Experiment 3

Under substantially the same conditions as employed in Example 3, the reactions were conducted at an equivalent ratio of sulfuric acid to potassium chloride of 1.10, with an agitator blade which was varied, so that the results obtained by kneading the solid-liquid mixture at the final reaction stage were compared with those obtained without the kneading, in respect of reaction periods of time required for lowering the chlorine content of the product to desired levels. In Table 3, a Run No. A shows the case where the same agitator device as employed in Example 3 was employed, and a Run No. B shows the case where instead of the plate type blade there were employed 8 mm (diameter) × +mm (length) rods. The rods attached onto the periphery of one shaft were arranged in alternate relationship with the rods of the other shaft so that they did not hold substantially the same plane of rotation in common.

TABLE 3

| Run No. | Equivalent ratio (1) | State of solid-liquid mixture at final reaction stage (2) | Filling level (3) | Kneading performance (4) | Reaction time required (hr) (5) Cl ≦ 1.0 wt % | Reaction time required (hr) (5) Cl ≦ 0.3 wt % | Degree of contamination of hydrogen chloride by-produced (6) |
|---|---|---|---|---|---|---|---|
| A | 1.10 | Funicular (I) | O | O | 0.5 | 1.0 | 0.8 |
| B | 1.10 | Funicular (I) | O | Δ | 1.0 | 3.0 | 0.8 |

Note
With respect to the explanations of the items of "Reaction conditions and Results", reference may be made to those of the Note of Table 2.

As is apparent from Table 3, even though the equivalent ratio of sulfuric acid to potassium chloride is fixed at 1.10 and the reaction was so conducted that the state of the solid-liquid mixture at the final reaction stage is in the funicular (I) region, the performance of kneading of the solid-liquid mixture changes according to the change in the structure of the agitator blade. In the process of the present invention, by effecting an efficient kneading, the reaction period of time can surprisingly be extremely shortened beyond the usual expectation. Illustratively stated, the reaction period of time required for lowering the chlorine content of the product to not more than 1.0 weight % is shortened to a half, and that required for lowering the chlorine content of the product to not more than 0.3 weight % is shortened even to one third. Similarily, from the results of Example 4 (which will be given later) also, it can be understood that the effect of the kneading is exerted over the whole range as specified in the present invention with respect to equivalent ratio of sulfuric acid to potassium chloride. Alteration in kneading performance can be attained by changing not only the design of the agitator blade but also the degree of filling the reaction furnace with the raw materials, the revolution speed of the agitator, etc.

The reason why the above-mentioned effect is achieved by kneading is not theoretically elucidated but believed to be as follows. The solid-liquid mixture is largely composed of small lump granules of potassium sulfate. When such lump granules are subjected to kneading, they are destroyed by the actions of laminar flow shearing, milling, folding, grinding, milling-fragmentation and compression, whereby the minute amount of potassium chloride occluded in the lump granules of potassium sulfate is caused to be exposed and reacted with potassium bisulfate excessively present in the surrounding. Accordingly, the intended reaction is greatly accelerated. It is noted that, even if the minute amount of potassium chloride occluded in the lumps of potassium sulfate is caused to be exposed by kneading, the intended reaction would not proceed unless excess potassium bisulfate is present. Although the intended reaction proceeds without kneading of the solid-liquid mixture so far as potassium bisulfate is excessively present in the mixture, it is practically desirable to knead the solid-liquid mixture for effecting the reaction in a short period of time stably on an industrial scale.

The phenomena peculiar to kneading occur only in the solid-liquid system in which excess potassium bisulfate is present in an amount above a certain level even at the final stage of the reaction. By kneading the reaction mixture in such a state of solid-liquid, namely, in a state of wet cake, according to the present invention, the desired potassium sulfate salt with an extremely low chlorine content suitable for use as a fertilizer material can be obtained in a short period of time by a one-step process, with extremely high stability as compared to that in the process in which a kneading operation is not involved.

In order to maintain the solid-liquid mixture at the final reaction stage in a state of wet cake, the reaction temperature is required to be at least the melting point of potassium bisulfate derived from the excess sulfuric acid employed. The upper limit of the reaction temperature is 500° C. in the process of the present invention. In actual practice of the process of the present invention, in order to lower the chlorine content of the product to not more than 1.0% or not more than 0.3% in a short period of time, it is necessary to employ a temperature of about 300° C. or higher. On the other hand, when the reaction temperature exceeds about 450° C., unfavorable side reactions such as decomposition of potassium bisulfate and the like tend to occur. Therefore, it is preferred that the reaction temperature be in the range of about 300° C. to about 450° C. The more preferred reaction temperature is in the range of about 350° C. to 450° C. The reaction period of time varies depending on the equivalent ratio of sulfuric acid to potassium chloride, reaction temperature and the like. Usually, the reaction period of time may be in the range of from about 10 minutes to about 2 hours, preferably in the range of from about 30 minutes to about 1 hour. The process of the present invention is by far advantageous over the conventional processes in that a potassium sulfate salt with an extremely low chlorine content can be obtained by the reaction at a markedly low temperature for a very short period of time according to the process of the present invention.

As to sulfuric acid and potassium chloride, it is sufficiently satisfactory to employ those of a common grade for the industrial use. The particle size of potassium chloride is not critical. Potassium chloride particles of an industrial grade having an average particle size of about 300$\mu$ may be used without any disadvantage, but those from which the particles having sizes larger than about 840$\mu$ (about 20 Tyler mesh) have been removed may be more preferably used. Excessively attrited potassium chloride particles are not desirable because too minute particles tend to unfavorably undergo a secondary aggregation during the reaction.

A potassium sulfate salt produced according to the process of the present invention contains, besides potassium sulfate, a considerable quantity of potassium bisulfate. The potassium sulfate salt may be neutralized with, for example, ammonia according to a customary method so that it may be used as one component of a bulk blend manure. However, it is desirable that the potassium sulfate salt be transferred directly to a process for the preparation of a potassium-containing chemical manure. For example, when the potassium sulfate salt produced by the process of the present invention is trasferred to a step for the decomposition of an ore of phosphorus, the potassium bisulfate contained in said potassium sulfate salt functions as an acid and participates in the decomposition of the phosphorus ore. In this case, the decomposition of the phosphorus ore can be effectively conducted only by adjusting the amount of a mineral acid such as sulfuric acid or nitric acid to be supplied for the decomposition of the phosphorus ore in relation to the amount of the potassium bisulfate remaining in the potassium sulfate salt. Therefore, it is not necessary to neutralize the potassium bisulfate contained in the potassium sulfate salt product. Further, the sulfate group of the potassium bisulfate salt can be utilized for the removal of calcium which is undesirable in the chemical manure. On the other hand, in the case where the potassium sulfate salt is transferred to a neutralization step in the manufacture of the chemical manure, it is charged into a vessel into which ammonia is blown so that the potassium bisulfate contained in the potassium sulfate salt is utilized as an acid for fixing ammonia in such an amount as is required for exerting a fertilizing effect. In the case where the potassium sulfate salt is added after the neutralization step in the manufacture of the chemical manure, it theoretically seems necessary to effect neutralization of the potassium bisulfate beforehand. In the actual practice, however, even if the potassium sulfate salt as such is added after the neutralization step, the pH value of the system is not so lowered due to the complicated buffer action of the components of the system. The potassium sulfate salt is desirably transferred directly to the step for the preparation of the chemical manure in which step the potassium sulfate salt is dissolved in a mineral acid, because the heat accompanying the potassium sulfate salt from the reaction step can be utilized. In case the potassium sulfate salt is transported to other place and used there, it is advantageous that the potassium sulfate salt in a state of wet cake is extrusion-molded at about 200° C. to obtain the salt product in the form of a tablet so that it can be easily handled.

As described before and is apparent from the results of Tables 1, 2 and 3 and the following Examples and Comparative Examples, according to the present invention, there can be achieved various advantages as follows:

(1) Only by a one-step process, there can be obtained a potassium sulfate salt with a chlorine content as low as less than 1.0%, desirably less than 0.3%, with high stability.

(2) The degree of contamination of the hydrogen chloride formed as a by-product is low.

(3) The reaction temperature is in the range of from the melting point of potassium bisulfate to about 500° C. which is relatively low.

(4) The reaction period of time may be as short as up to 2 hours.

(5) The process can be practiced using an apparatus of simple structure, and the cost of energy is low.

A potassium sulfate salt product produced according to the process of the present invention has an extremely low chlorine content and is useful especially as a raw material for the production of chemical manures to be applied onto the farmland of tobacco etc. which are apt to have their growth hampered by chlorine values.

The present invention will now be described in detail with reference to the following Examples that by no means limit the scope of the present invention.

EXAMPLE 1

A heat-resistant cast-steel pugmixer type reaction apparatus was used. The reaction apparatus had a width of 150 mm, a height of 150 mm and a length of 600 mm and was equipped with a jacket and a heat-resistant cast-steel twin traverse-feed type agitator. The apparatus was provided with a raw materials inlet, a product outlet, a by-produced hydrogen chloride gas vent and a temperature detection terminal. A weir having a height of 50 mm was provided on the side of the product outlet, so that the product overflowed the weir and was discharged. The jacket was filled with a molten salt mixture composed of potassium nitrate, sodium nitrite and sodium nitrate which mixture was a heating medium capable of being heated up to a predetermined temperature by means of electrical heating.

The heating medium was heated up to 430° C. 3.25 Kg per hour of potassium chloride of a common industrial grade having a purity of 98.5% and 2.51 Kg per hour of sulfuric acid having a purity of 98% were continuously fed through the inlet to the reaction apparatus while operating the agitator at 10 rpm to produce about 4 kg per hour of a potassium sulfate salt and about 1.6 Kg per hour of hydrogen chloride gas. The average residence time was 20 minutes under the above-mentioned conditions. The analysis of the potassium sulfate salt product showed 48.0 weight % of potassium in terms of $K_2O$ and 0.3 weight % of chlorine values. The analysis of the by-produced hydrogen chloride gas showed 1.0 weight % of $SO_2$. In this run, the equivalent ratio of sulfuric acid to potassium chloride was 1.172.

EXAMPLE 2 and Comparative Example 1

Potassium sulfate salts were each produced in substantially the same manner as in Example 1 except that the equivalent ratio of sulfuric acid to potassium chloride, the reaction temperature and the reaction time (average residence time) were changed as indicated in Table 4. The potassium sulfate salts produced were each analyzed to find a remaining chloride values content which is shown in Table 4.

TABLE 4

| | | Remaining chlorine values content (weight %) | | | | | | | | | | |
|---|---|---|---|---|---|---|---|---|---|---|---|---|
| Run No. | | 1 | 2 | 3 | 4 | 5 | 6 | 7 | 8 | 9 | 10 | 11 |
| Equivalent ratio $\left(\dfrac{2[H_2SO_4]}{[KCl]}\right)$ | | 1.00 | 1.00 | 1.00 | 1.05 | 1.05 | 1.05 | 1.07 | 1.07 | 1.07 | 1.07 | 1.10 |
| Reaction temperature (°C.) | | 250 | 300 | 400 | 350 | 400 | 450 | 300 | 350 | 400 | 450 | 400 |
| | 0.3 | 18.0 | 16.5 | 7.5 | 5.0 | 4.0 | 4.0 | 6.0 | 3.5 | 3.0 | 3.0 | 2.5 |
| | 0.6 | 16.5 | 14.0 | 6.0 | 4.3 | 3.5 | 3.3 | 5.1 | 2.7 | 2.0 | 1.5 | 1.7 |

TABLE 4-continued

| | | Remaining chlorine values content (weight %) | | | | | | | | | |
|---|---|---|---|---|---|---|---|---|---|---|---|
| Reaction time (hr) | 1.0 | 16.0 | 8.0 | 4.0 | 3.0 | 2.5 | 3.0 | 4.3 | 1.5 | 1.3 | 1.3 | 1.0 |
| | 2.0 | 16.0 | 5.0 | 3.5 | 2.0 | 1.5 | 1.5 | 3.0 | 1.0 | 1.0 | 1.0 | 0.7 |
| | 4.0 | 15.8 | 4.0 | 3.0 | 1.5 | 1.5 | 1.5 | 1.0 | 0.5 | 0.5 | 0.3 | 0.2 |
| | 6.0 | 15.5 | 3.8 | 2.7 | 1.2 | 1.3 | 1.2 | 0.4 | 0.3 | 0.3 | 0.2 | 0.1 |

| Run No. | | 12 | 13 | 14 | 15 | 16 | 17 | 18 | 19 | 20 | 21 | 22 |
|---|---|---|---|---|---|---|---|---|---|---|---|---|
| Equivalent ratio $\left(\frac{2[H_2SO_4]}{[KCl]}\right)$ | | 1.12 | 1.12 | 1.12 | 1.12 | 1.12 | 1.15 | 1.30 | 1.30 | 1.30 | 1.30 | 1.30 |
| Reaction temperature (°C.) | | 250 | 300 | 350 | 400 | 450 | 400 | 250 | 300 | 350 | 400 | 450 |
| Reaction time (hr) | 0.3 | 13.0 | 1.8 | 2.5 | 1.0 | 0.7 | 0.9 | 11.5 | 1.7 | 0.7 | 0.5 | 0.5 |
| | 0.6 | 11.6 | 1.5 | 0.5 | 0.6 | 0.5 | 0.5 | 10.5 | 1.3 | 0.3 | 0.3 | 0.3 |
| | 1.0 | 11.2 | 0.8 | 0.5 | 0.3 | 0.4 | 0.3 | 9.8 | 0.8 | 0.2 | 0.3 | 0.3 |
| | 2.0 | 11.0 | 0.5 | 0.4 | 0.2 | 0.2 | 0.1 | 9.5 | 0.5 | 0.2 | 0.1 | 0.1 |
| | 4.0 | 11.0 | 0.3 | 0.1 | 0.1 | 0.1 | 0.1 | 9.7 | 0.3 | 0.1 | 0.1 | 0.1 |
| | 6.0 | 10.8 | 0.2 | 0.1 | 0.1 | 0.1 | 0.1 | 9.6 | 0.1 | 0.1 | 0.1 | 0.1 |

| Run No. | | 23 | 24 | 25 | 26 | 27 | 28 | 29 | 30 | 31 | 32 |
|---|---|---|---|---|---|---|---|---|---|---|---|
| Equivalent ratio $\left(\frac{2[H_2SO_4]}{[KCl]}\right)$ | | 1.40 | 1.40 | 1.40 | 1.40 | 1.40 | 1.50 | 1.50 | 1.50 | 1.50 | 1.50 |
| Reaction temperature (°C.) | | 250 | 300 | 350 | 400 | 450 | 250 | 300 | 350 | 400 | 450 |
| Reaction time (hr) | 0.3 | 10.7 | 1.3 | 1.0 | 0.5 | 0.5 | 10.5 | 1.0 | 1.0 | 0.6 | 0.6 |
| | 0.6 | 9.3 | 1.0 | 0.3 | 0.3 | 0.3 | 10.3 | 0.9 | 0.5 | 0.3 | 0.4 |
| | 1.0 | 9.0 | 0.5 | 0.1 | 0.1 | 0.1 | 10.0 | 0.4 | 0.2 | 0.2 | 0.3 |
| | 2.0 | 8.9 | 0.3 | 0.1 | 0.1 | 0.1 | 9.7 | 0.4 | 0.1 | 0.1 | 0.1 |
| | 4.0 | 8.8 | 0.1 | 0.1 | 0.1 | 0.1 | 9.3 | 0.2 | 0.1 | 0.1 | 0.1 |
| | 6.0 | 8.7 | 0.1 | 0.1 | 0.1 | 0.1 | 8.8 | 0.2 | 0.1 | 0.1 | 0.1 |

Comparative Example 2

Potassium chloride was reacted with sulfuric acid at an equivalent ratio of sulfuric acid to potassium chloride of 1.45 at 350° C. to obtain a mixture of 45 weight % of potassium sulfate and 55 weight % of potassium bisulfate. The mixture was cooled and pulverized. The pulverized mixture was sufficiently mixed with finely divided potassium chloride to obtain a mixture having a molar ratio of potassium bisulfate to potassium chloride of just 1.0. The mixture thus obtained was again subjected to a reaction at 400° C. and at a varied residence time in the same reaction apparatus as used in Example 1. At the final stage of the reaction, each reaction mixture was in a dry state. The remaining chlorine values content of each product is shown in Table 5.

TABLE 5

| Residence Time (hr) | 1.0 | 2.0 | 4.0 | 6.0 |
|---|---|---|---|---|
| Chlorine Values Content (wt. %) | 3.5 | 3.0 | 2.0 | 1.5 |

EXAMPLE 3

A pugmixer type reaction apparatus having a 160 mm × 160 mm × 860 mm carborundum reaction furnace was used. The apparatus was equipped with a heat-resistant cast-steel twin agitator device and an electrical heating means, and provided with a raw materials inlet, a product outlet, a by-produced hydrogen chloride gas vent and a temperature detection terminal. The agitator device consisted of two unit agitators each comprising a shaft and 20 sets each of three 20 mm (width) × 30 mm (length) plate type blades attached to the shaft. The three plate type blades were disposed on a plane perpendicular to the axis of the shaft and attached onto the periphery of the shaft at an angle of 120 degrees between the respective two blades adjacent to each other. 20 Sets of the three plate type blades were arranged axially of the shaft. Every set of blades of one unit agitator and the corresponding set of blades of the other unit agitator closely overlapped each other to a large extent on substantially the same plane of rotation so that every pair of facing blades could exert scraping and kneading effects.

The reaction furnace was heated up to 400° C. 8.5 Kg per hour of potassium chloride having a purity of 98.5% and such particle sizes as passed a 20 Tyler mesh-sieve and 6.45 Kg per hour of sulfuric acid having a purity of 98.0% which had been premixed in a premixer were continuously fed through the inlet to the reaction apparatus while operating the agitator device at 50 rpm to produce 10.5 Kg per hour of a pottasium sulfate salt and 4.15 Kg per hour of by-produced hydrogen chloride gas. The average residence time of the reaction mixture in the furnace was about 30 minutes. In this run, the charging equivalent ratio of sulfuric acid to potassium chloride was 1.15.

The state of the solid-liquid mixture in the furnace was of slurry near the inlet and in the funicular (I) or (II) region near the outlet where the reaction is of final stage since the amount of solids increased with the gradual formation of potassium sulfate. The amount of the remaining molten potassium bisulfate (intermediate) was about 20 weight %. The reaction mixture moved through the furnace while filling the furnace with the mixture to the height which the locus of rotation of the tip end of each blade reached, and it was observed that an efficient kneading of the reaction mixture was effected near the outlet.

The analysis of the potassium sulfate salt product showed 49.7 weight % of potassium in terms of $K_2O$ and 0.2 weight % of remaining chlorine values.

EXAMPLE 4

Reactions were conducted under substantially the same conditions as in Example 3 except that an equivalent ratio of sulfuric acid to potassium chloride was varied as indicated in Table 6 and a reaction temperature as indicated in Table 6 was adopted. In Table 6, the mark "A" attached to Run No. indicates the case where the same agitator device as employed in Example 3 was employed while the mark "B" attached to Run No. indicates the case where instead of the plate type blades as used in the agitator device as employed in Example 3, there were employed 8 mm (diameter)×30 mm (length) rods. The rods attached onto the periphery of one shaft were arranged in alternate relationship with the rods of the other shaft so that they did not hold substantially the same plane of rotation in common. In the runs marked as "B" in which the agitator device having the agitating rods was employed, the kneading was not effective. The results are shown in Table 6.

TABLE 6

| Run No. | Equivalent ratio (1) | Reaction time required at a temperature indicated just below (hr)² | | | |
|---|---|---|---|---|---|
| | | 300° C. | 350° C. | 400° C. | 450° C. |
| 1-A | 1.07 | 2.0 | 1.0 | 0.5 | 0.4 |
| 1-B | 1.07 | more than 6.0 | 6.0 | 6.0 | 4.0 |
| 2-A | 1.10 | 1.5 | 0.7 | 0.5 | 0.3 |
| 2-B | 1.10 | 4.0 | 2.5 | 1.0 | 1.0 |
| 3-A | 1.20 | 1.0 | 0.5 | less than 0.3 | less than 0.3 |
| 3-B | 1.20 | 3.5 | 1.0 | 1.0 | 1.0 |
| 4-A | 1.40 | 0.5 | less than 0.3 | less than 0.3 | less than 0.3 |
| 4-B | 1.40 | 2.0 | 0.6 | 0.6 | 0.6 |

(Note)
(1) Equivalent ratio of sulfuric acid to potassium chloride.
(2) The reaction period of time required for decreasing the chlorine content of the product to less than 0.3 weight % was measured.

We claim:

1. A process for producing a potassium sulfate salt which comprises reacting sulfuric acid with potassium chloride at an equivalent ratio range of sulfuric acid to potassium chloride of 1.07 to 1.40, based on the production of potassium sulfate, at a temperature of from above 250° C. to about 500° C., while kneading the resulting solid-liquid mixture by shearing, folding, milling and compressing at the final stage of the reaction wherein molten potassium bisulfate is present in said solid-liquid mixture, said potassium bisulfate being produced in the course of the reaction and being left in the product of the reaction because of the excess sulfuric acid, said potassium sulfate salt produced having a chloride content less than about one (1) percent by weight and said equivalent ratio enabling said resulting solid-liquid mixture to be kneaded at the final stage of the reaction.

2. A process according to claim 1, wherein the equivalent ratio range of sulfuric acid to potassium chloride is in the range of 1.10 to 1.30.

3. A process according to claim 2, wherein the equivalent ratio range of sulfuric acid to potassium chloride is in the range of 1.10 to 1.20.

4. A process according to claim 1, wherein the reaction temperature is about 300° C. to about 450° C.

5. A process according to claim 5, wherein the reaction temperature is about 350° C. to about 450° C.

6. A process according to claim 1, wherein the reaction is conducted for about 10 minutes to about 2 hours.

7. A process according to claim 6, wherein the reaction is conducted for about 30 minutes to about 1 hour.

* * * * *

UNITED STATES PATENT AND TRADEMARK OFFICE
CERTIFICATE OF CORRECTION

PATENT NO. : 4,342,737
DATED : August 3, 1982
INVENTOR(S) : Hidemaro Iwashita et al.

It is certified that error appears in the above—identified patent and that said Letters Patent is hereby corrected as shown below:

Claim 5, line 1, change "5" to --4--.

Signed and Sealed this

Nineteenth Day of October 1982

[SEAL]

Attest:

GERALD J. MOSSINGHOFF

Attesting Officer

Commissioner of Patents and Trademarks